(12) United States Patent
Nakamura et al.

(10) Patent No.: US 12,546,806 B2
(45) Date of Patent: Feb. 10, 2026

(54) STRETCH DETECTION SYSTEM FOR POWER TRANSMISSION MECHANISM

(71) Applicant: Hitachi, Ltd., Tokyo (JP)

(72) Inventors: Akihiro Nakamura, Tokyo (JP); Takahiro Yamada, Tokyo (JP); Daisuke Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 265 days.

(21) Appl. No.: 18/203,870

(22) Filed: May 31, 2023

(65) Prior Publication Data

US 2023/0417809 A1 Dec. 28, 2023

(30) Foreign Application Priority Data

Jun. 27, 2022 (JP) .................................. 2022-102816

(51) Int. Cl.
*G01R 23/16* (2006.01)
*B65G 23/00* (2006.01)

(52) U.S. Cl.
CPC ............. *G01R 23/16* (2013.01); *B65G 23/00* (2013.01)

(58) Field of Classification Search
CPC .............................. G01R 23/16; G01R 31/343
See application file for complete search history.

(56) References Cited

U.S. PATENT DOCUMENTS

| 5,377,931 | A | * | 1/1995 | Dorfel | .................... | B65H 18/26 |
| | | | | | | 242/542.3 |
| 2020/0284690 | A1 | * | 9/2020 | Kanemaru | .......... | G01M 13/023 |
| 2021/0348974 | A1 | * | 11/2021 | Sekiguchi | ............... | H02P 21/13 |

FOREIGN PATENT DOCUMENTS

WO 2018/109993 A1 6/2018

* cited by examiner

*Primary Examiner* — Alesa Allgood
(74) *Attorney, Agent, or Firm* — MATTINGLY & MALUR, PC

(57) ABSTRACT

A stretch detection system of a power transmission mechanism is connectable to a conveyor system including a motor, a rotation mechanism driven by the motor, and the power transmission mechanism driven by rotation of the rotation mechanism. The stretch detection system converts a signal of a current of the motor into a frequency domain signal, and calculates an integral value by performing integration on the frequency domain signal obtained by the frequency domain signal conversion unit, by using, as an integration range, at least one of regions of a sideband wave having a frequency determined using a rotation frequency of the rotation mechanism. A stretch diagnosis unit diagnoses a state of stretch of the power transmission mechanism by using the integral value calculated by the integral value calculation unit. Further, an output unit outputs a diagnosis result of the stretch diagnosis unit.

9 Claims, 13 Drawing Sheets

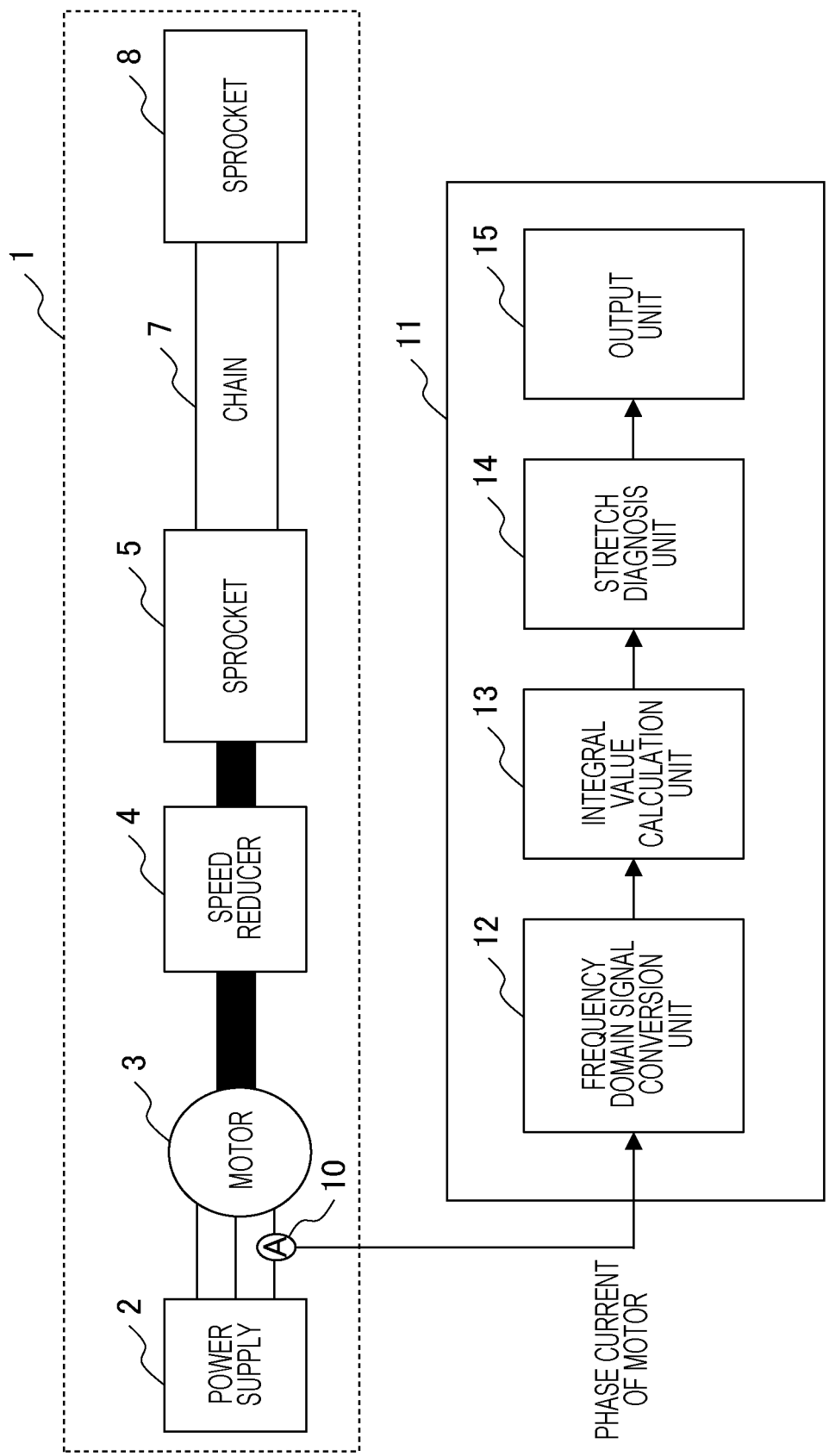

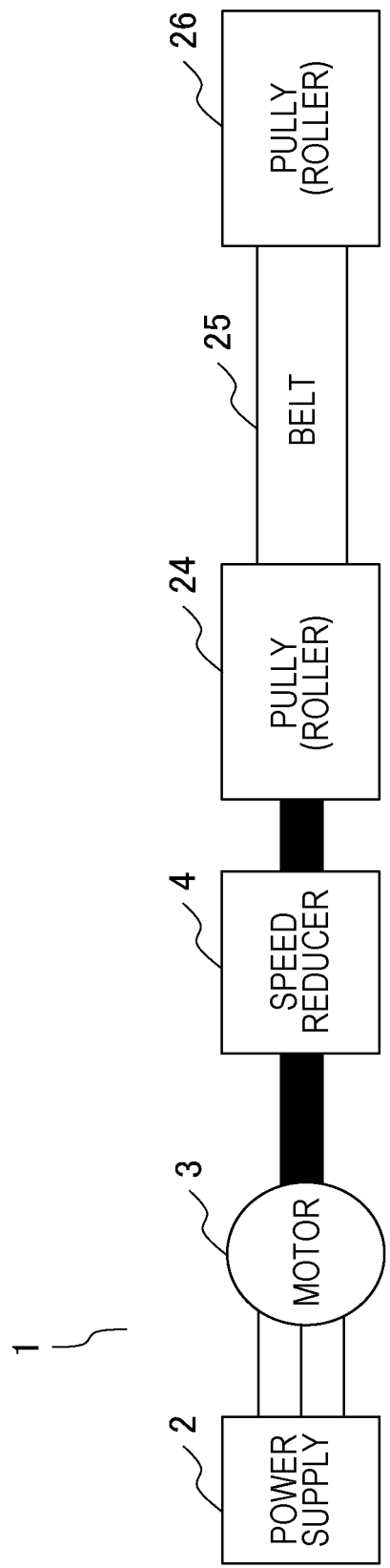

NORMAL TIME

TIME OF CHAIN STRETCH

STRETCH DETECTION SYSTEM FOR POWER TRANSMISSION MECHANISM

CLAIM OF PRIORITY

The present application claims priority from Japanese Patent Application JP 2022-102816 filed on Jun. 27, 2022, the content of which is hereby incorporated by reference into this application.

BACKGROUND OF THE INVENTION

1. Field of the Invention

The present invention relates to a system that detects stretch of a power transmission mechanism driven by a motor or the like.

2. Description of the Related Art

In recent years, due to the spread of the Internet of Things (IoT), the advancement of artificial intelligence (AI), and the decrease in the labor population, attention has been paid to techniques for automatically performing abnormality diagnosis of a mechanical device from information acquired by a sensor or the like for the purpose of improving the efficiency of maintenance work and saving labor. Among the techniques, a diagnosis method related to a power transmission mechanism (for example, a belt or a chain), which is an important component of a conveyor that conveys a load or the like in a factory, has been proposed. For example, an abnormality diagnosis device of a power transmission mechanism, which has been disclosed in International Publication No. 2018/109993, includes a current detector connected to a power supply line of an electric motor (motor), an abnormality determination unit that determines an abnormality of the power transmission mechanism (belt), and an abnormal frequency count unit that detects the frequency of the power supply and the number of sideband waves other than a power transmission mechanism frequency. The abnormality determination unit includes a level determination unit that determines an abnormality level from the detected number of sideband waves other than the power transmission mechanism frequency.

SUMMARY OF THE INVENTION

In a conventional technique such as the technique disclosed in International Publication No. 2018/109993, it is necessary to calculate a rotation frequency of the power transmission mechanism (for example, a belt) in order to diagnose the abnormality of the power transmission mechanism. In order to calculate this frequency, it is necessary to grasp the length of the belt, but it is difficult to accurately grasp the length of the belt that changes with time. In addition, in the technique disclosed in International Publication No. 2018/109993, the sideband wave to be observed has a wide frequency range and also includes a frequency component for capturing an abnormality of a motor or a mechanical device connected to the motor. That is, there is a probability of an erroneous diagnosis that an abnormality occurring in a device other than the power transmission mechanism is included in the abnormality of the power transmission mechanism. For example, when a harmonic frequency of the rotation frequency of the motor is included in the frequency range to be observed, there is a probability that an abnormality of the mechanical device that can be captured by the harmonic frequency component is erroneously diagnosed as an abnormality of the belt.

Among the abnormalities of the power transmission mechanism, the abnormality having the highest occurrence frequency is stretch (looseness). Therefore, there is a demand for a system capable of easily detecting the stretch of the power transmission mechanism without using mechanical parameters (for example, the length of the power transmission mechanism) that change with time and without an erroneous diagnosis.

An object of the present invention is to provide a system capable of reducing an erroneous diagnosis and detecting stretch of a power transmission mechanism without obtaining a length of the power transmission mechanism.

According to the present invention, a stretch detection system of a power transmission mechanism is connectable to a conveyor system including a motor, a rotation mechanism driven by the motor, and the power transmission mechanism driven by rotation of the rotation mechanism. The stretch detection system includes a frequency domain signal conversion unit that converts a signal of a current of the motor into a frequency domain signal, an integral value calculation unit that calculates an integral value by performing integration on the frequency domain signal obtained by the frequency domain signal conversion unit, by using, as an integration range, at least one of regions of a sideband wave having a frequency determined using a rotation frequency of the rotation mechanism, a stretch diagnosis unit that diagnoses a state of stretch of the power transmission mechanism by using the integral value calculated by the integral value calculation unit, and an output unit that outputs a diagnosis result of the stretch diagnosis unit.

According to the present invention, it is possible to provide a system capable of reducing an erroneous diagnosis and detecting stretch of a power transmission mechanism without obtaining a length of the power transmission mechanism.

BRIEF DESCRIPTION OF THE DRAWINGS

FIG. 1 is a diagram illustrating a configuration example of a stretch detection system of a power transmission mechanism according to a first embodiment of the present invention;

FIG. 2 is a diagram illustrating a configuration example of a conveyor system including a belt as the power transmission mechanism;

DESCRIPTION OF THE PREFERRED EMBODIMENTS

Figure 3A:
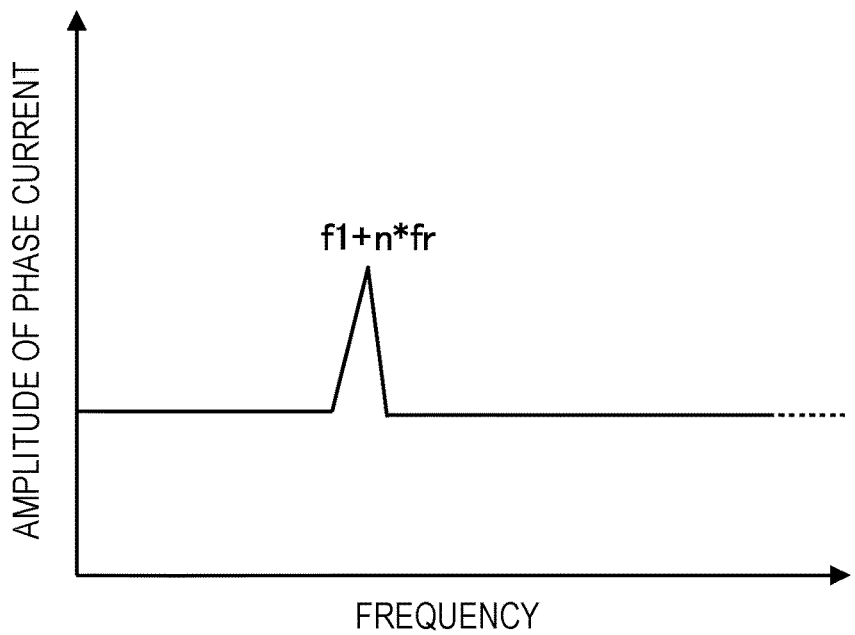
FIG. 3A is a diagram illustrating an example of a frequency spectrum diagram of a phase current of a motor when a chain is normal.

A stretch detection system of a power transmission mechanism according to the present invention can detect the stretch of the power transmission mechanism (for example, a chain, a belt, or the like) driven by a motor separately from abnormalities of other parts, and can reduce an erroneous diagnosis. In addition, the stretch detection system according to the present invention can easily detect the stretch of the power transmission mechanism without using mechanical parameters that change with time, such as the length of the power transmission mechanism.

Hereinafter, a stretch detection system of a power transmission mechanism according to embodiments of the present invention will be described with reference to the drawings. In the following embodiments, a configuration in which the power transmission mechanism is a chain will be described as an example, but the power transmission mechanism in which the stretch detection system according to the present embodiment detects the stretch is not limited to a chain, and may be another mechanism such as a belt. In the drawings used in the present specification, the same or corresponding components are denoted by the same reference numerals, and repeated description of these components may be omitted.

First Embodiment

A stretch detection system of a power transmission mechanism according to a first embodiment of the present invention will be described. The stretch detection system according to the present embodiment detects stretch of a chain being a power transmission mechanism by using a motor phase current of one phase.

FIG. 1 is a diagram illustrating a configuration example of a stretch detection system 11 of a power transmission mechanism according to the present embodiment. The stretch detection system 11 according to the present embodiment can be connected to a conveyor system 1. The conveyor system 1 includes a chain 7 as a power transmission mechanism.

First, the conveyor system 1 will be described. The conveyor system 1 includes a power supply 2, a motor 3, a speed reducer 4, a sprocket 5 on a driving side, a chain 7, and a sprocket 8 on a driven side.

The power supply 2 drives the motor 3. The power supply 2 may be an inverter or a system power supply.

The motor 3 is mechanically connected to the speed reducer 4 and applies power to the speed reducer 4.

The speed reducer 4 includes an output shaft, decelerates the power of the motor 3, and outputs the power to the output shaft.

The sprocket 5 on the driving side is connected to the output shaft of the speed reducer 4, and rotates as the output shaft rotates. The sprocket 5 is a rotation mechanism that is driven by the motor 3 to rotate, and drives the chain 7 being the power transmission mechanism by this rotation.

The chain 7 is assembled with the sprocket 5. When the sprocket 5 rotates, the chain 7 is driven, and transmits the power of the output shaft of the speed reducer 4 to the sprocket 8 on the driven side. That is, the chain 7 is driven by the rotation of the sprocket 5 and transmits a driving force of the motor 3 to the sprocket 8.

The sprocket 8 on the driven side is assembled with the chain 7 and is driven by the chain 7 to rotate.

The sprockets 5 and 8 are driven by the chain 7 at the same rotation. Although the conveyor system 1 includes the two sprockets 5 and 8 in the example illustrated in FIG. 1, the conveyor system 1 may include a configuration in which three or more sprockets are driven by one chain 7.

As described above, the power transmission mechanism in which the stretch detection system 11 according to the present embodiment detects stretch is not limited to the chain 7, and may be another mechanism such as a belt.

FIG. 2 is a diagram illustrating a configuration example of the conveyor system 1 including a belt 25 as the power transmission mechanism. When the power transmission mechanism is the belt 25, the belt 25 is assembled with pulleys (or rollers) 24 and 26. When the pulley 24 rotates, the belt 25 transmits the power of the output shaft of the speed reducer 4 to the pulley 26. Although a configuration in which the power transmission mechanism is the chain 7 will be described in the following description, even when the power transmission mechanism is the belt 25, the stretch detection system 11 according to the present embodiment has the similar configuration to the case where the power transmission mechanism is the chain 7.

Returning to FIG. 1, the stretch detection system 11 according to the present embodiment will be described. The stretch detection system 11 includes a current sensor 10, a frequency domain signal conversion unit 12, an integral value calculation unit 13, a stretch diagnosis unit 14, and an output unit 15, and detects stretch of the chain 7.

The current sensor 10 is a current acquisition unit that acquires a value of a phase current from the motor 3. In the present embodiment, the current sensor 10 acquires a current value of one phase in the phase current of the motor 3.

The frequency domain signal conversion unit 12 converts the signal of a one-phase phase current of the motor 3 acquired by the current sensor 10 into a frequency domain signal.

The integral value calculation unit 13 performs integration on the frequency domain signal obtained by the frequency domain signal conversion unit 12 by using a specific frequency range as an integration range S, and calculates an integral value in the integration range S.

The stretch diagnosis unit 14 diagnoses the stretch state of the chain 7 by using the integral value calculated by the integral value calculation unit 13.

The output unit 15 outputs the diagnosis result of the stretch diagnosis unit 14 to at least one of the device included in the stretch detection system 11 and the device connected to the stretch detection system 11. Examples of the device included in the stretch detection system 11 and the device connected to the stretch detection system 11 include a display, a speaker, a lamp (indicator lamp), a control device of the conveyor system 1, and a control device of the motor 3.

The frequency domain signal conversion unit 12, the integral value calculation unit 13, the stretch diagnosis unit 14, and the output unit 15 will be described below in detail.

The frequency domain signal conversion unit 12 acquires the time-series data of a current having any one phase of a U-phase, a V-phase, and a W-phase of the phase current of the motor 3 from the current sensor 10, and converts the acquired time-series data of the one-phase current into a frequency domain signal. The frequency domain signal conversion unit 12 converts a time-series signal of the current of the motor 3 into a frequency domain signal, for example, by performing fast Fourier transform (FFT).

The integral value calculation unit 13 calculates an integral value of the frequency domain signal obtained by the frequency domain signal conversion unit 12, in a specific frequency range. This integral value is a feature amount for detecting the stretch of the chain 7.

Here, a relationship between a physical phenomenon when the chain 7 is stretched and the integral value calculated by the integral value calculation unit 13 will be described. In the conveyor system 1 (FIG. 1), a mechanical design is usually made such that the natural frequency of the chain 7 is higher than the rotation frequency of the sprocket 5. However, when the chain 7 stretches, the natural frequency of the chain 7 decreases and approaches the rotation frequency of the sprocket 5 and harmonic frequency thereof to start large vibration (resonance). This phenomenon will be described by using a frequency spectrum diagram of the phase current of the motor 3.

Figure 3B:
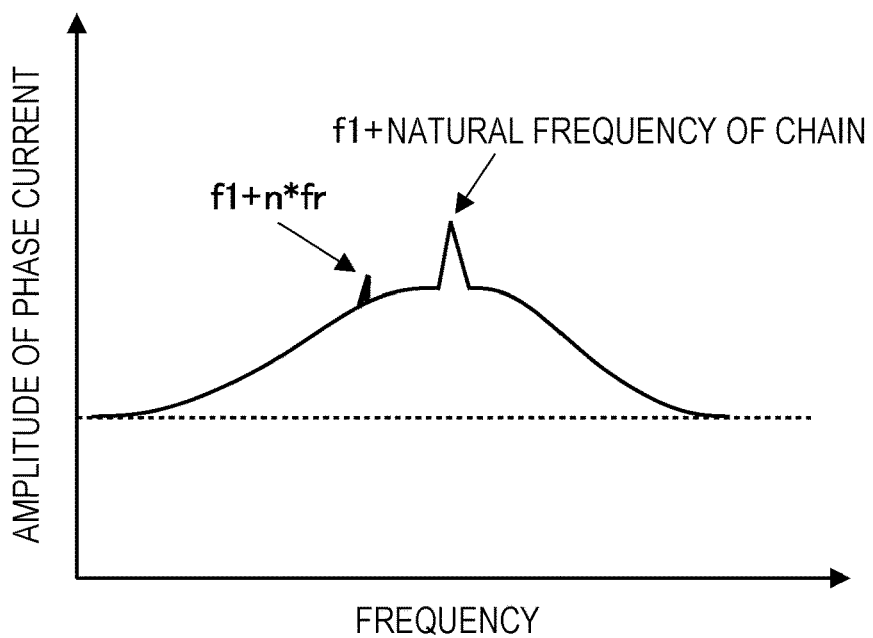
FIG. 3B is a diagram illustrating an example of a frequency spectrum diagram of the phase current of the motor when the chain is stretched.

FIGS. 3A and 3B are diagrams illustrating frequency characteristics (change in amplitude depending on frequency) of the phase current of the motor 3. FIG. 3A is a diagram illustrating an example of a frequency spectrum diagram of the phase current of the motor 3 when the chain 7 is normal. FIG. 3B is a diagram illustrating an example of a frequency spectrum diagram of the phase current of the motor 3 when the chain 7 is stretched.

The rotation frequency of the sprocket 5 is represented below by fr, and the rotation frequency fr and the harmonic frequency thereof are collectively represented below as n*fr. n is an integer of 1 or more, and the frequency n*fr represents the rotation frequency fr of the sprocket 5 when n=1, and represents the n-th harmonic frequency of the rotation frequency fr when n≥2. The frequency of the power supply 2 is referred to as a power supply frequency f1.

As illustrated in FIG. 3A, when the chain 7 is normal, that is, when the chain 7 is not stretched, in the frequency spectrum of the phase current of the motor 3, a peak appears at a frequency (f1+n*fr) obtained by adding the rotation frequency of the sprocket 5 and the harmonic frequency n*fr thereof to the power supply frequency f1, and no noticeable peak appears at frequencies other than the frequency (f1+n*fr).

As illustrated in FIG. 3B, when the chain 7 is stretched, the natural frequency of the chain 7 decreases, and the frequency obtained by adding the power supply frequency f1 to the natural frequency of the chain 7 approaches the frequency (f1+n*fr) and starts to resonate. Therefore, the frequency spectrum of the phase current of the motor 3 bulges in a range (frequency (f1+n*fr) and the vicinity) including the frequency (f1+n*fr), and the amplitude of the phase current of the motor 3 increases. This bulging of the spectrum (increase in amplitude of the phase current of the motor 3 at the frequency near the frequency (f1+n*fr)) gradually increases as stretching of the chain 7 proceeds.

In the stretch detection system 11 according to the present embodiment, the integral value calculation unit 13 captures this bulging of the spectrum as an integral value, and thus the stretch state of the chain 7 is diagnosed. The processing performed by the integral value calculation unit 13 will be described with reference to FIG. 4.

Figure 4:
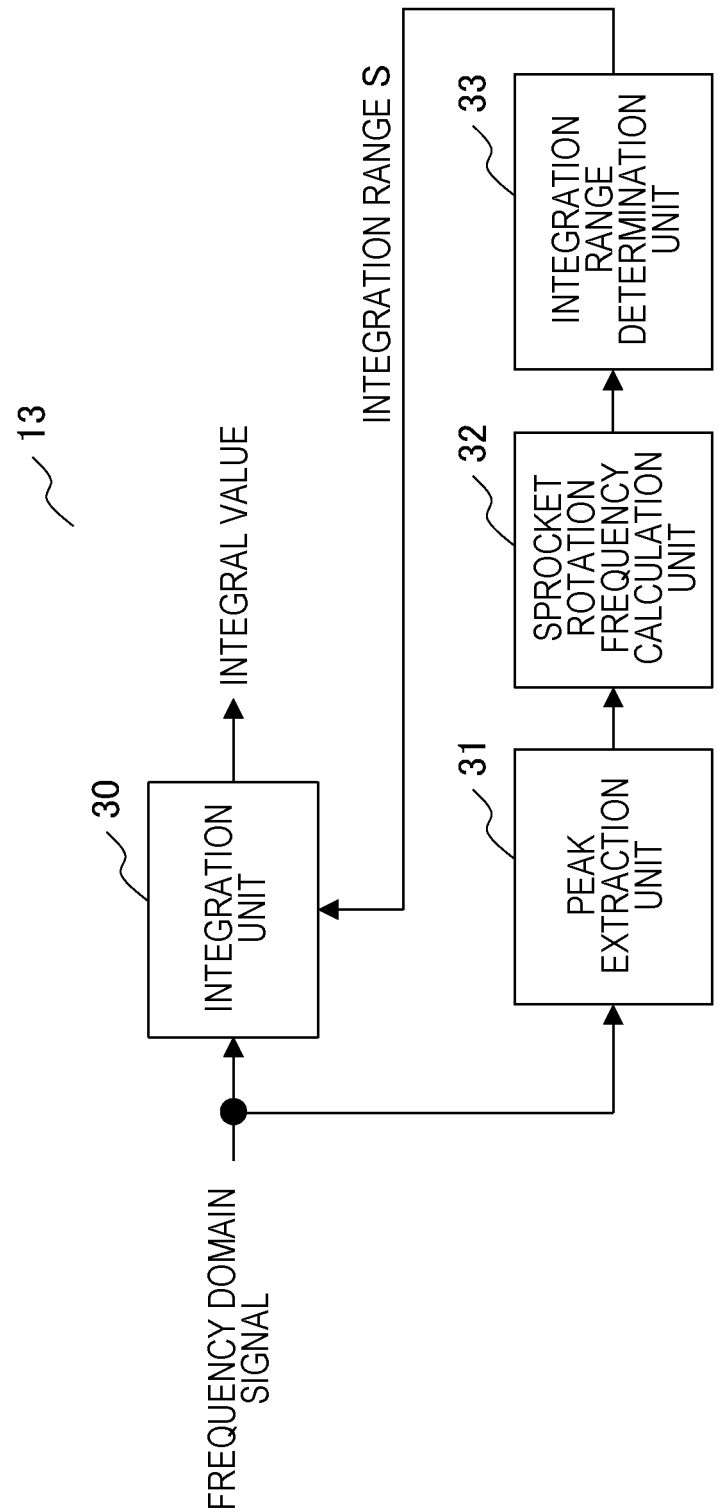
FIG. 4 is a diagram illustrating a configuration and a flow of processing of an integral value calculation unit in the first embodiment.

FIG. 4 is a diagram illustrating a configuration and a flow of processing of the integral value calculation unit 13. The integral value calculation unit 13 includes an integration unit 30, a peak extraction unit 31, a sprocket rotation frequency calculation unit 32, and an integration range determination unit 33.

The integral value calculation unit 13 inputs the frequency domain signal obtained by the frequency domain signal conversion unit 12 to the integration unit 30 and the peak extraction unit 31. The peak extraction unit 31, the sprocket rotation frequency calculation unit 32, and the integration range determination unit 33 perform processing for determining the integration range S.

The peak extraction unit 31 extracts a frequency giving the maximum peak value in the frequency domain signal obtained by the frequency domain signal conversion unit 12. This frequency is the frequency of the power supply 2 (power supply frequency f1).

Figure 5:
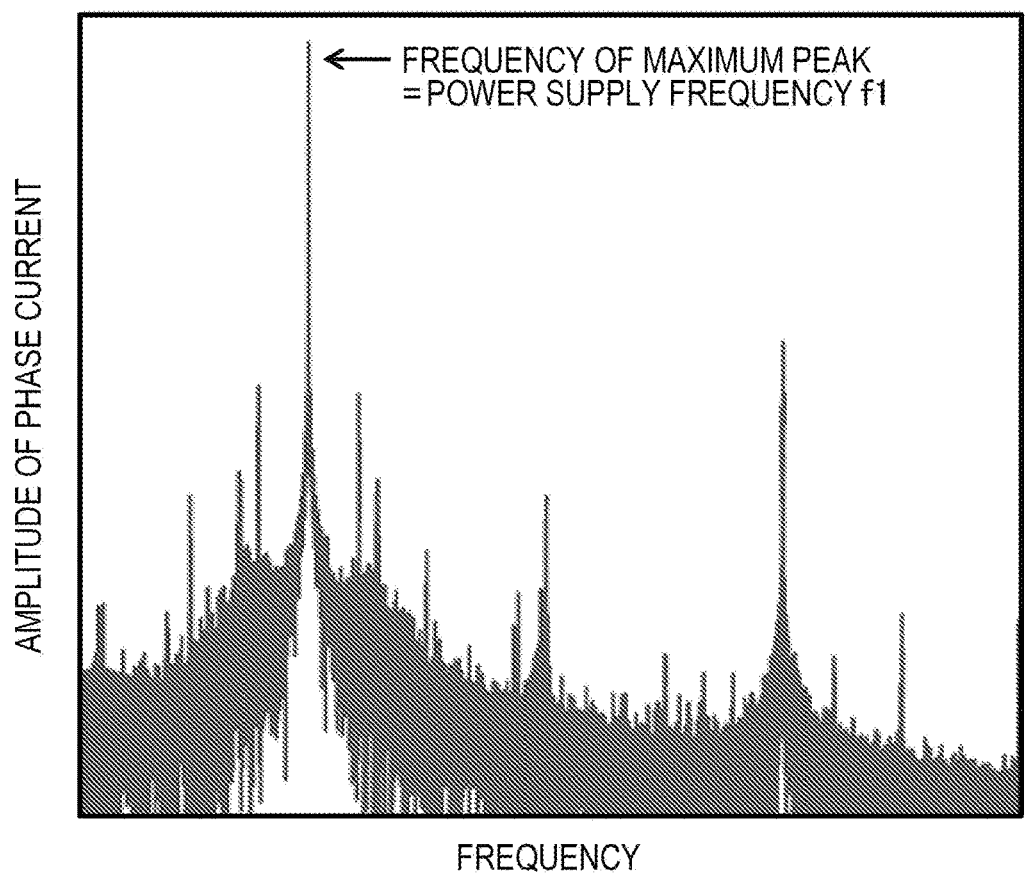
FIG. 5 is a frequency spectrum diagram illustrating an example of a frequency domain signal of a phase current of a motor, which is obtained by a frequency domain signal conversion unit.

FIG. 5 is a diagram (frequency spectrum diagram) illustrating an example of the frequency domain signal of the phase current of the motor 3, which is obtained by the frequency domain signal conversion unit 12. As illustrated in FIG. 5, the frequency giving the maximum peak value in the frequency domain signal is the power supply frequency f1.

Returning to FIG. 4, the description of the integral value calculation unit 13 will be continued.

The sprocket rotation frequency calculation unit 32 obtains the rotation frequency fr of the sprocket 5 that drives the chain 7 from the power supply frequency f1. A known method can be used to calculate the rotation frequency fr of the sprocket 5. For example, the rotation frequency fr of the sprocket 5 can be calculated by dividing the power supply frequency f1 by the number of pole pairs of the motor 3 and further by a reduction ratio (defined as a value more than 1) of the speed reducer 4. When the motor 3 is a magnet motor, the rotation frequency fr of the sprocket 5 can be accurately obtained by this calculation method. However, when the motor 3 is an induction motor, the rotation frequency fr of the sprocket 5 is preferably set to a frequency that is lower than the calculated frequency by 1 to 2% because there is slippage.

The integration range determination unit 33 determines the integration range S based on the rotation frequency fr of the sprocket 5. In the present embodiment, the integration range S is at least one of regions of the sideband wave of the frequency (f1+n*fr) obtained by adding the rotation frequency of the sprocket 5 and the harmonic frequency n*fr thereof to the power supply frequency f1 (n is an integer of 1 or more). That is, the integration range S is at least one of the regions of the sideband wave of the frequency (f1+fr) obtained by adding the rotation frequency fr of the sprocket 5 to the power supply frequency f1 and the regions of the sideband wave of the frequency (f1+na*fr) obtained by adding the harmonic frequency na*fr (na is an integer of 2 or more) of the rotation frequency fr of the sprocket 5 to the power supply frequency f1.

The sideband wave is a signal at a frequency near a specific center frequency (for example, the frequency (f1+n*fr) in the present embodiment, and a frequency n*fr in a second embodiment). Thus, the region of the sideband wave is a frequency domain near the center frequency, and is a region of a frequency higher than the center frequency and a region of a frequency lower than the center frequency.

Figure 6:
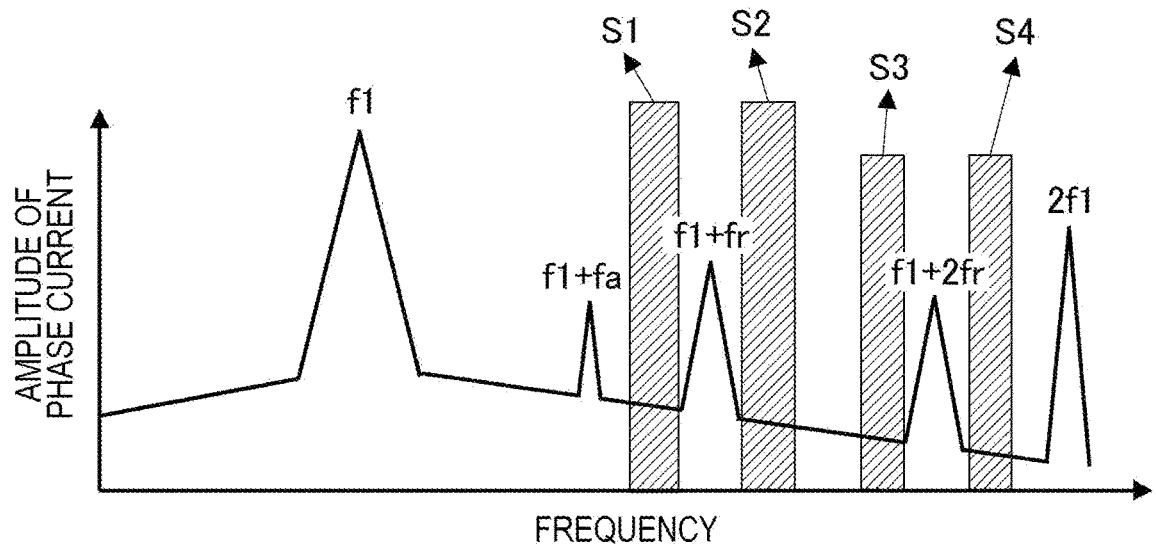
FIG. 6 is a diagram illustrating an example of an integration range in the frequency spectrum diagram of the phase current of the motor.

FIG. 6 is a diagram illustrating an example of the integration range S in the frequency spectrum diagram of the phase current of the motor 3. In FIG. 6, f1 represents the power supply frequency, fr represents the rotation frequency of the sprocket 5 that drives the chain 7, and 2*fr* represents a second-harmonic frequency of the rotation frequency fr. For simple illustration, FIG. 6 illustrates frequencies up to the second-harmonic frequency.

It is known that, in the phase current of the motor 3, the frequency of the mechanical load variation appears as a sideband wave in frequency bands on both sides (high frequency side and low frequency side) of the power supply frequency f1. As described with reference to FIG. 3B, the stretch occurring in the chain 7 can be detected by capturing the bulging (increase in amplitude of the phase current of the motor 3 at the frequency near the frequency n*fr) in the range including the frequency n*fr in the frequency spectrum of the phase current of the motor 3.

Therefore, in the present embodiment, in order to detect the change in the amplitude of the phase current at the frequency near the frequency (f1+n*fr), the integration range S is set to at least one frequency domain among the regions of the sideband wave on both sides (high frequency side and low frequency side) of the frequency (f1+n*fr). n is any integer of 1 or more. FIG. 6 illustrates, as an example, four integration ranges S, that is, regions S1 and S2 of a sideband wave on both sides of the frequency (f1+fr) and regions S3 and S4 of a sideband wave on both sides of the frequency (f1+2fr). In the example illustrated in FIG. 6, the integration range S is at least one frequency domain among the regions S1, S2, S3, and S4 of the sideband wave.

The integration range determination unit 33 can freely determine the width (frequency range) of the integration range S (in FIG. 6, the regions S1, S2, S3, and S4). For example, the width of the integration range S can be defined by a predetermined specific numerical value.

When there are a plurality of integration ranges S, it is preferable that the integration ranges S do not overlap each other. That is, it is preferable that the regions of the sideband wave at adjacent frequencies do not overlap each other. For example, the region S2 and the region S3 do not overlap each other at the frequency (f1+fr) and the frequency (f1+2fr) which are adjacent frequencies. When the regions of the sideband waves at adjacent frequencies overlap each other, there is a probability that it is not possible to accurately capture the above-described spectrum bulge as the integral value. Therefore, it is preferable that the integration ranges S do not overlap each other.

As an example of a method of determining the width of the integration range S, the integration range S can be set to a range of ±α % centering on the frequency (f1+n*fr). In order to prevent an occurrence of a situation in which the regions of the sideband waves at adjacent frequencies overlap each other, the width of the integration range S is preferably set to satisfy α≤1/(2m−1) (m is the maximum order of the harmonic frequencies used and m=2 when the second harmonic frequency is the maximum harmonic frequency used). As another example, the integration range S can be set to a range of ±β, Hz centering on the frequency (f1+n*fr). In order to prevent an occurrence of a situation in which the regions of the sideband waves at adjacent frequencies overlap each other, the width of the integration range S is preferably set to satisfy β≤0.5fr.

An important point when the integration range determination unit 33 determines the integration range S is that the integration range S does not include the frequency (f1+n*fr) (n is an integer of 1 or more). That is, the integration range S does not include the frequency (f1+fr) obtained by adding the rotation frequency fr of the sprocket 5 to the power supply frequency f1 and the frequency (f1+na*fr) obtained by adding the harmonic frequency na*fr of the rotation frequency fr of the sprocket 5 to the power supply frequency f1 (na is an integer of 2 or more). This is because the component of the frequency (f1+n*fr) can be used for detecting eccentricity, misalignment, and vibration of the shaft connected to the sprocket 5. That is, when the integration range S includes the frequency (f1+n*fr), an abnormality other than the abnormality caused by the stretch of the chain 7 is also detected. Therefore, in order to suppress an erroneous detection, it is preferable to exclude the frequency (f1+n*fr) from the integration range S.

FIG. 6 illustrates a frequency component fa in which the amplitude of the phase current increases due to an abnormality other than the abnormality caused by the stretch of the chain 7. The frequency component fa is used to monitor an abnormality other than the abnormality caused by the stretch of the chain 7.

Preferably, the integration range determination unit 33 causes the integration range S not to further include the frequency component fa in which the amplitude of the phase current increases due to an abnormality other than the abnormality caused by the stretch of the chain 7, the harmonic frequency n*f1 of the power supply frequency f1, and the like. In the example illustrated in FIG. 6, the integration range determination unit 33 preferably determines the integration range S such that the integration range S does not include the frequency (f1+fa) and the frequency 2f1.

The integration range determination unit 33 can determine any integration range S among the plurality of integration ranges S, as the integration range S used by the integration unit 30 to perform integration. For example, when the procedure for determining the integration range S in the region of the sideband wave on the low frequency side of the frequency (f1+n*fr) is complicated, the integration range determination unit 33 may determine the integration range S by using only the region of the sideband wave on the high frequency side of the frequency (f1+n*fr). In addition, the integration range determination unit 33 can determine a frequency range as far as possible from the frequency fa, as the integration range S.

The integration range determination unit 33 can determine any number of integration ranges S among the plurality of integration ranges S, as the integration range S used by the integration unit 30 to perform integration. For example, the integration range determination unit 33 may determine the region of the sideband wave on the high frequency side of the frequency (f1+fr), as the integration range S, or may determine the regions of the sideband waves on both sides of each of the frequency (f1+fr), the frequency (f1+2fr), and the frequency (f1+3fr), as the integration range S.

When there are a plurality of integration ranges S determined by the integration range determination unit 33, the integration unit 30 performs integration for each of the plurality of integration ranges S.

The integration range determination unit 33 can determine the number of integration ranges S used by the integration unit 30 to perform integration, for example, in accordance with a calculation load of the integral value calculation unit 13. In addition, the integration range determination unit 33 can determine which integration range S is to be used (for example, which region among the four regions S1 to S4 is used as the integration range S) among the plurality of integration ranges S, for example, in accordance with a difference in frequency between the power supply frequency f1, the harmonic frequency n*f1, or the frequency fa, and the integration range S.

The integration range determination unit 33 determines the integration range S based on the rotation frequency fr of the sprocket 5 in the above-described manner. When the integration range determination unit 33 determines the integration range S, the integration unit 30 calculates an integral value in the integration range S.

As illustrated in FIG. 4, the integration unit 30 receives an input of the frequency domain signal obtained by the frequency domain signal conversion unit 12 and the integration range S determined by the integration range determination unit 33, and obtains the integral value by calculation of integrating the frequency domain signal in the integration range S. As described above, when there are the plurality of integration ranges S, the integration unit 30 performs integration for each of the plurality of integration ranges S.

The integral value calculation unit 13 calculates the integral value which is a feature amount for detecting the stretch of the chain 7 in the above-described manner.

The stretch diagnosis unit 14 in FIG. 1 will be described. The stretch diagnosis unit 14 diagnoses the stretch state of the chain 7 by using the integral value calculated by the integral value calculation unit 13. The integral value calculation unit 13 calculates an integral value by using, as the integration range S, at least one frequency domain among the regions (for example, the regions S1 to S4) of the sideband wave on both sides of the frequency (f1+n*fr). The stretch diagnosis unit 14 diagnoses the stretch state of the chain 7 by using at least one of the integral values calculated by the integral value calculation unit 13. The stretch diagnosis unit 14 can diagnose the stretch state of the chain 7 by using any method, and can select a diagnosis method in accordance with the purpose of diagnosis. A representative diagnosis method will be described below with reference to FIGS. 7A to 7C.

Figure 7A:
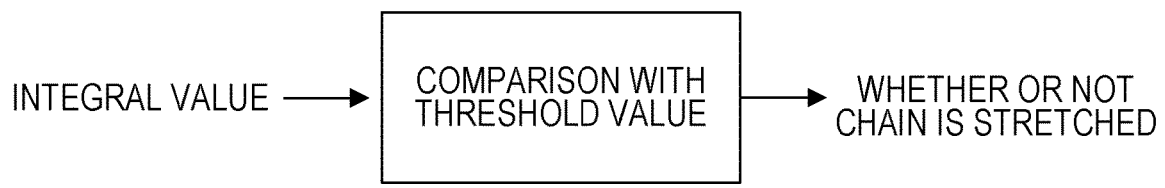
FIG. 7A is a diagram illustrating a first example of a method of diagnosing a stretch state of the chain.

FIG. 7A is a diagram illustrating a first example of a method of diagnosing the stretch state of the chain 7. In the method illustrated in FIG. 7A, the stretch diagnosis unit 14 compares the integral value calculated by the integral value calculation unit 13 to a predetermined threshold value. When the integral value is more than the threshold value, the stretch diagnosis unit 14 diagnoses that the chain 7 is stretched by a predetermined amount or more, and an abnormal has occurred.

Figure 7B:
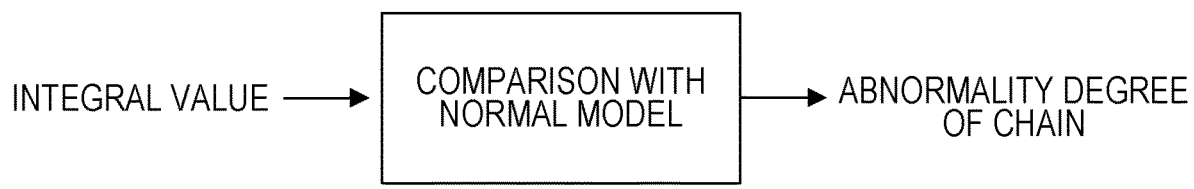
FIG. 7B is a diagram illustrating a second example of the method of diagnosing the stretch state of the chain.

FIG. 7B is a diagram illustrating a second example of the method of diagnosing the stretch state of the chain 7. In the method illustrated in FIG. 7B, the stretch diagnosis unit 14 compares the integral value with a normal model of the chain 7 created in advance to obtain an abnormality degree of the chain 7, and diagnoses the stretch state of the chain 7 by using the abnormality degree. The normal model of the chain 7 can be created in advance by defining a normal space using an integral value obtained for the chain 7 in a normal state in which no stretch occurs. The stretch diagnosis unit 14 calculates how much the integral value calculated by the integral value calculation unit 13 deviates from the normal model as the abnormality degree, and diagnoses the stretch state of the chain 7 (for example, the degree of stretch) in accordance with the magnitude of the abnormality degree. Any method can be used as a method of calculating the abnormality degree. For example, a Mahalanobis Taguchi (MT) method or the like can be used.

Figure 7C:
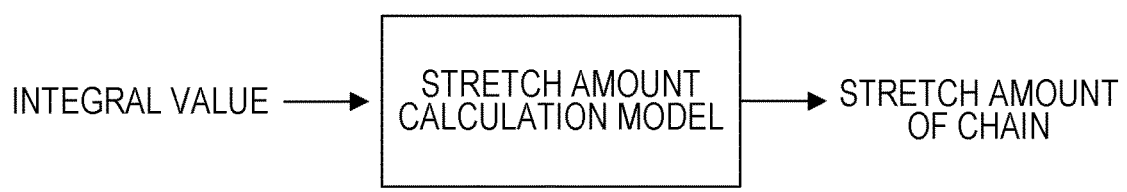
FIG. 7C is a diagram illustrating a third example of the method of diagnosing the stretch state of the chain.

FIG. 7C is a diagram illustrating a third example of the method of diagnosing the stretch state of the chain 7. In the method illustrated in FIG. 7C, the stretch diagnosis unit 14 creates, in advance, a model (stretch amount calculation model) indicating a relationship between the integral value and the actual stretch amount of the chain 7, and obtains the stretch amount of the chain 7 from the integral value calculated by the integral value calculation unit 13 by using this model. The stretch diagnosis unit 14 may diagnose that the chain 7 is abnormal when the stretch amount of the chain 7 is more than a predetermined threshold value. The stretch amount calculation model can be created in advance in a manner that the relationship between the integral value and the actual stretch amount of the chain 7 is modeled by, for example, supervised learning represented by regression analysis or the like.

The output unit 15 in FIG. 1 will be described. The output unit 15 outputs a diagnosis result in the stretch diagnosis unit 14. For example, the output unit 15 can display the diagnosis result on the display and explicitly transmit the diagnosis result to a worker or the like. The output unit 15 can inform the worker of the abnormality visually or audibly by turning on (or blinking) a lamp or emitting a sound from a speaker in accordance with the diagnosis result. In addition, the output unit 15 can output the diagnosis result to the control device of the conveyor system 1 or the control device (for example, an inverter which is the power supply 2) of the motor 3. The diagnosis result output to the control device can be used as a trigger signal for stopping the conveyor system 1 or a trigger signal for changing the rotation frequency of the motor 3 so as to avoid vibration accompanying the stretch of the chain 7.

As described above, the stretch detection system 11 according to the present embodiment can detect the stretch of the chain 7 by a simple method without using mechanical parameters (for example, the length of the chain 7) that change with time. In addition, the stretch detection system 11 according to the present embodiment can detect the stretch of the chain 7 separately from an abnormality other than an abnormality caused by the stretch of the chain 7, and can reduce an erroneous diagnosis.

Second Embodiment

A stretch detection system 11 of a power transmission mechanism according to a second embodiment of the present invention will be described. Similarly to the stretch detection system 11 according to the first embodiment, the stretch detection system 11 according to the present embodiment detects the stretch of the chain 7 which is the power transmission mechanism by using the motor phase current of one phase. However, the stretch detection system 11 according to the present embodiment is different from the stretch detection system 11 according to the first embodiment in that an integral value is calculated by performing integration on an envelope component (DC value) of the phase current of the motor 3. The stretch detection system 11 according to the present embodiment will be mainly described below focusing on differences from the stretch detection system 11 according to the first embodiment.

Figure 8:
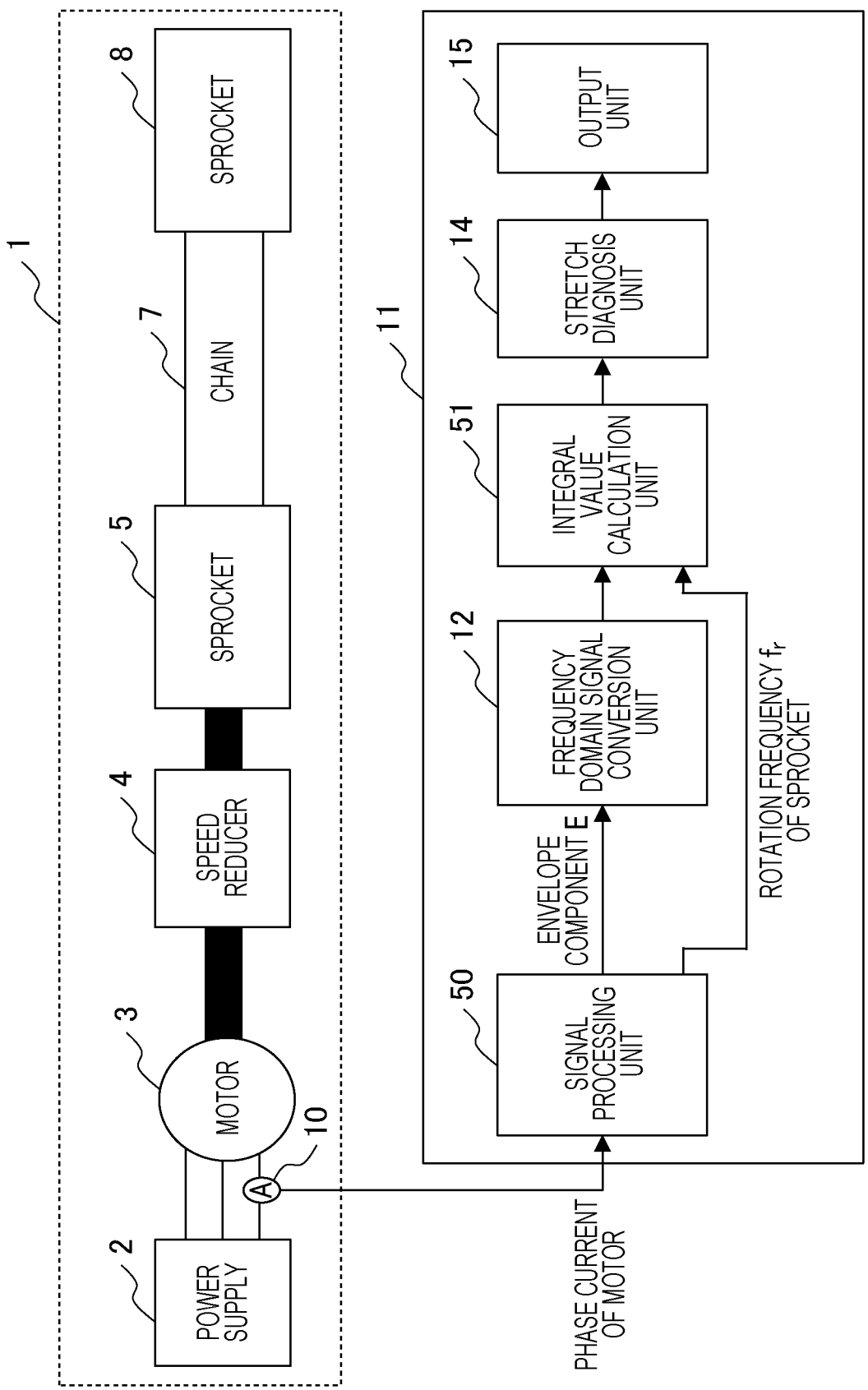
FIG. 8 is a diagram illustrating a configuration example of a stretch detection system of a power transmission mechanism according to a second embodiment of the present invention.

FIG. 8 is a diagram illustrating a configuration example of the stretch detection system 11 of the power transmission mechanism according to the present embodiment. The stretch detection system 11 according to the present embodiment is different from the stretch detection system 11 according to the first embodiment in that a signal processing unit 50 is provided, and an integral value calculation unit 51 performs processing different from that of the integral value calculation unit 13 in the stretch detection system 11 (FIG. 1) according to the first embodiment.

Figure 9:
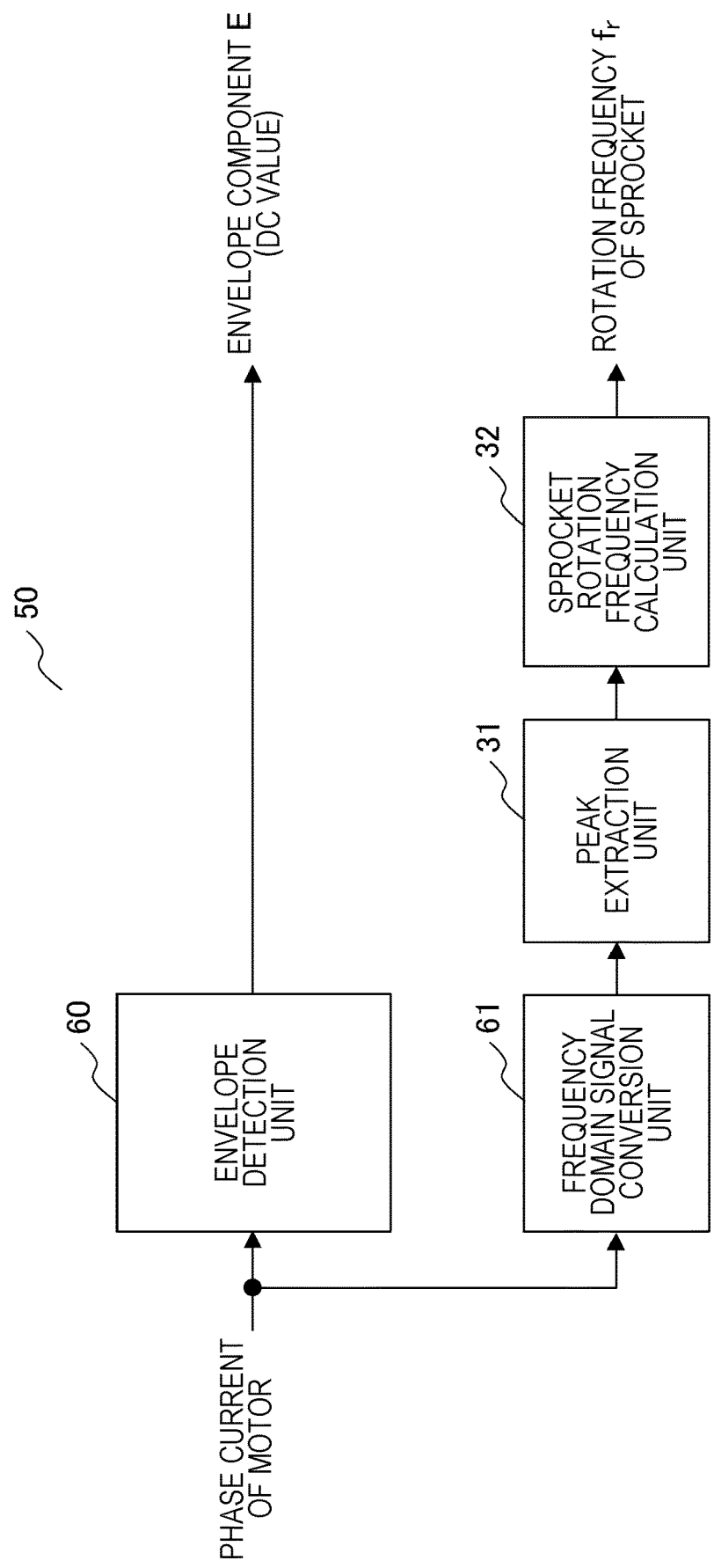
FIG. 9 is a diagram illustrating a configuration and a flow of processing of a signal processing unit in the second embodiment.

FIG. 9 is a diagram illustrating a configuration and a flow of processing of the signal processing unit 50. The signal processing unit 50 includes an envelope detection unit 60, a frequency domain signal conversion unit 61, a peak extraction unit 31, and a sprocket rotation frequency calculation unit 32, and receives an input of a current value of one phase in the phase current of the motor 3.

The envelope detection unit 60 receives the input of the phase current of the motor 3 and calculates an envelope component E that is a DC value (a value that is constant when there is no load variation or no noise) from the phase current that is an AC value. Since the envelope component E that is a DC value has a component obtained by removing the component of the power supply frequency f1 from the AC value, the noise level is low, and a small load variation is easily captured. The envelope detection unit 60 calculates the envelope component E from the phase current by any method such as Hilbert transform.

It is not possible that the integral value calculation unit 13 (FIG. 4) in the first embodiment extracts the power supply frequency f1 or calculates the rotation frequency fr of the sprocket 5 from the envelope component E of the phase current of the motor 3.

Therefore, in the present embodiment, the signal processing unit 50 includes the peak extraction unit 31 and the sprocket rotation frequency calculation unit 32, and thus extracts the power supply frequency f1 and calculates the rotation frequency fr of the sprocket 5. The peak extraction unit 31 and the sprocket rotation frequency calculation unit 32 perform the procedures described in the first embodiment to obtain the power supply frequency f1 and the rotation frequency fr of the sprocket 5, respectively. In addition, the signal processing unit 50 includes the frequency domain signal conversion unit 61 so that the peak extraction unit 31 can extract the power supply frequency f1. The frequency domain signal conversion unit 61 converts a time-series signal of the phase current of the motor 3 into a frequency domain signal, for example, by performing fast Fourier transform (FFT).

Returning to FIG. 8, the description of the stretch detection system 11 according to the present embodiment will be continued.

The frequency domain signal conversion unit 12 converts the signal of the envelope component E obtained by the signal processing unit 50 into a frequency domain signal.

Differing from the integral value calculation unit 13 in the first embodiment, the integral value calculation unit 51 receives the input of the rotation frequency fr of the sprocket 5 and the frequency domain signal of the envelope component E that is a DC value, and performs integration on the frequency domain signal of the envelope component E to calculate an integral value.

Figure 10:
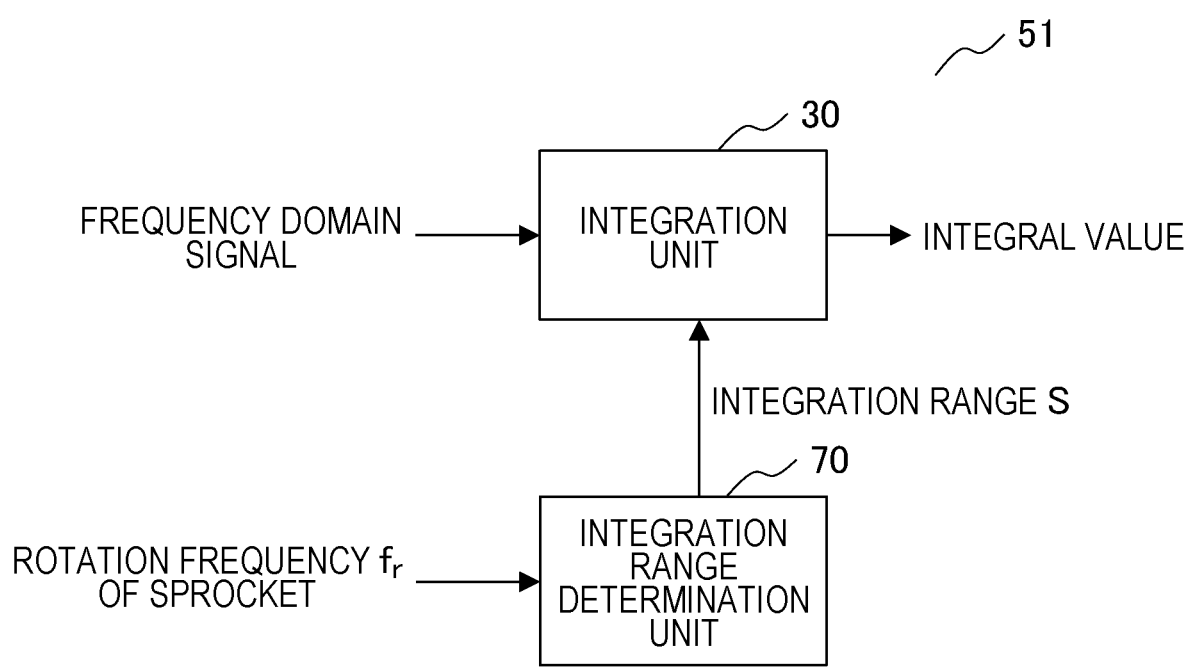
FIG. 10 is a diagram illustrating a configuration and a flow of processing of an integral value calculation unit in the second embodiment.

FIG. 10 is a diagram illustrating a configuration and a flow of processing of the integral value calculation unit 51. The integral value calculation unit 51 includes an integration unit 30 and an integration range determination unit 70.

The integration range determination unit 70 determines an integration range S based on the rotation frequency fr of the sprocket 5. In the present embodiment, the integration range S is at least one of the regions of the rotation frequency of the sprocket 5 and the sideband wave of the harmonic frequency n*fr of the rotation frequency (n is an integer of 1 or more). That is, the integration range S is at least one of the region of the sideband wave of the rotation frequency fr of the sprocket 5 and the region of the sideband wave of the harmonic frequency na*fr (na is an integer of 2 or more) of the rotation frequency fr of the sprocket 5. Differing from the integration range determination unit 33 in the first embodiment, the integration range determination unit 70 determines the integration range S without considering the power supply frequency f1.

The integration range determination unit 70 determines the integration range S such that the integration range S does not include the frequency n*fr for the similar reason to that described in the first embodiment (n is an integer of 1 or more). That is, the integration range S does not include the rotation frequency fr of the sprocket 5 and the harmonic frequency na*fr of the rotation frequency fr of the sprocket 5 (na is an integer of 2 or more).

In the first embodiment, the integration range determination unit 33 determines the integration range S by using a point that the frequency of the mechanical load variation appears as a sideband wave in the frequency bands on both sides of the power supply frequency f1.

In the present embodiment, the integration range determination unit 70 determines the integration range S by using the point that the frequency itself of the mechanical load variation is superimposed on the envelope (that is, the power supply frequency f1 is not added). Therefore, the integration range determination unit 70 does not need to add (consider) the power supply frequency f1, and determines, as the integration range S, at least one of the regions of the sideband wave of the rotation frequency of the sprocket 5 and the harmonic frequency n*fr thereof. The present embodiment corresponds to the case where the power supply frequency f1 is set to zero in the first embodiment.

The integration range determination unit 70 determines the integration range S for points other than the above description, such as the width (frequency range) of the integration range S, in the similar to that of the integration range determination unit 33 in the first embodiment.

The stretch detection system 11 according to the present embodiment uses the envelope component E of the phase current of the motor 3, and the envelope component E causes a small load variation to be easily captured. Thus, it is possible to detect the stretch of the chain 7 smaller than that of the stretch detection system 11 according to the first embodiment. Therefore, the stretch detection system 11 according to the present embodiment can more accurately detect the stretch of the chain 7.

Third Embodiment

A stretch detection system 11 of a power transmission mechanism according to a third embodiment of the present invention will be described. The stretch detection system 11 according to the present embodiment detects stretch of a chain 7 being the power transmission mechanism by using a motor phase current of two phases. In addition, the stretch detection system 11 according to the present embodiment obtains an estimated value of a torque current, and performs integration on the estimated value of the torque current to calculate an integral value. The torque current is a current for driving the motor 3 among currents flowing through the motor 3, and is represented by a DC value. The stretch detection system 11 according to the present embodiment will be mainly described below focusing on differences from the stretch detection system 11 according to the second embodiment.

Figure 11:
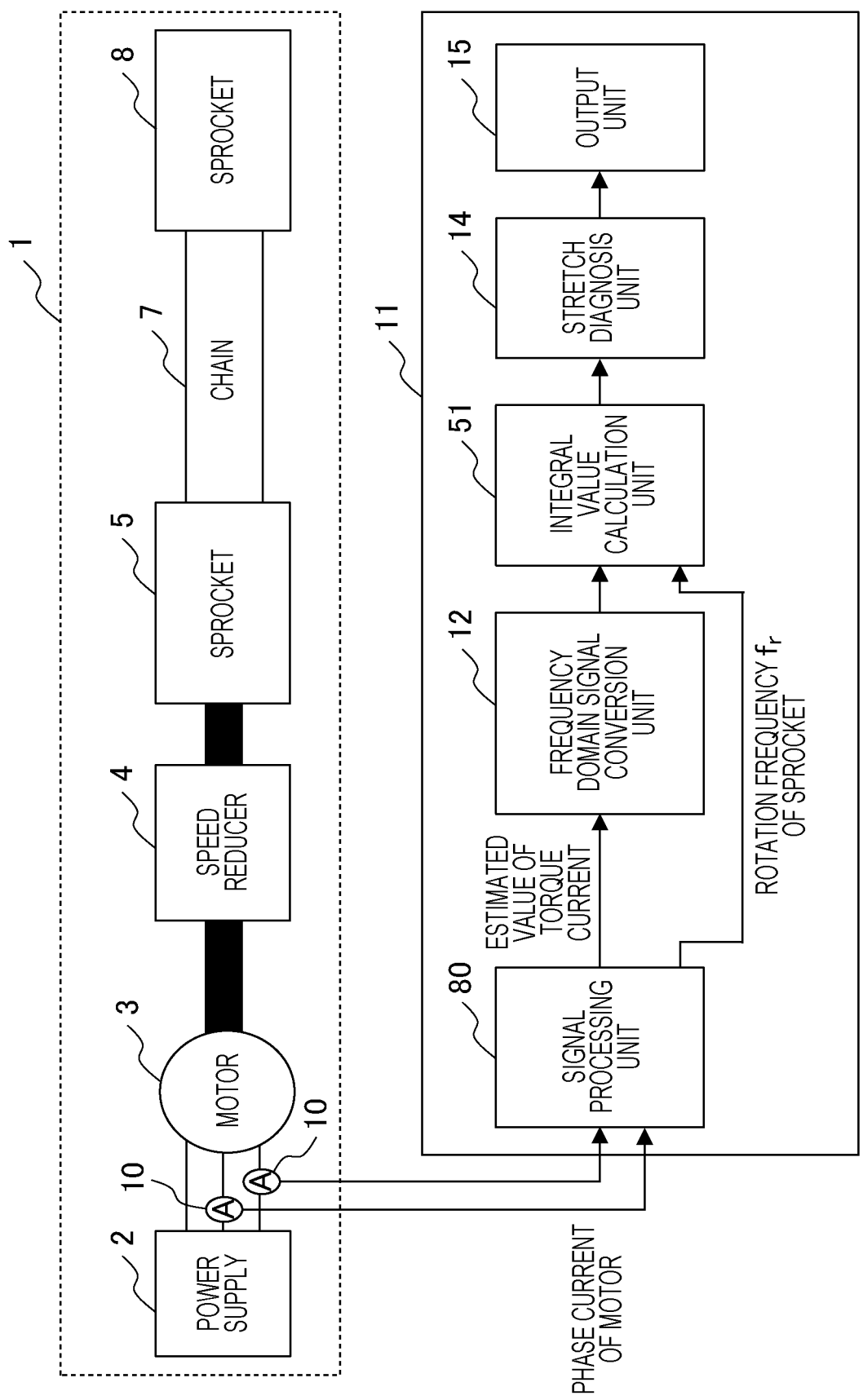
FIG. 11 is a diagram illustrating a configuration example of a stretch detection system of a power transmission mechanism according to a third embodiment of the present invention.

FIG. 11 is a diagram illustrating a configuration example of the stretch detection system 11 of the power transmission mechanism according to the present embodiment. The stretch detection system 11 according to the present embodiment is different from the stretch detection system 11 according to the second embodiment in that a signal processing unit 80 performs processing different from that of the signal processing unit 50 in the stretch detection system 11 (FIG. 8) according to the second embodiment. The stretch detection system 11 according to the present embodiment is also different from the stretch detection system 11 according to the second embodiment in that a current sensor 10 being a current acquisition unit acquires current values of any two phases of the phase current of the motor 3.

Figure 12:
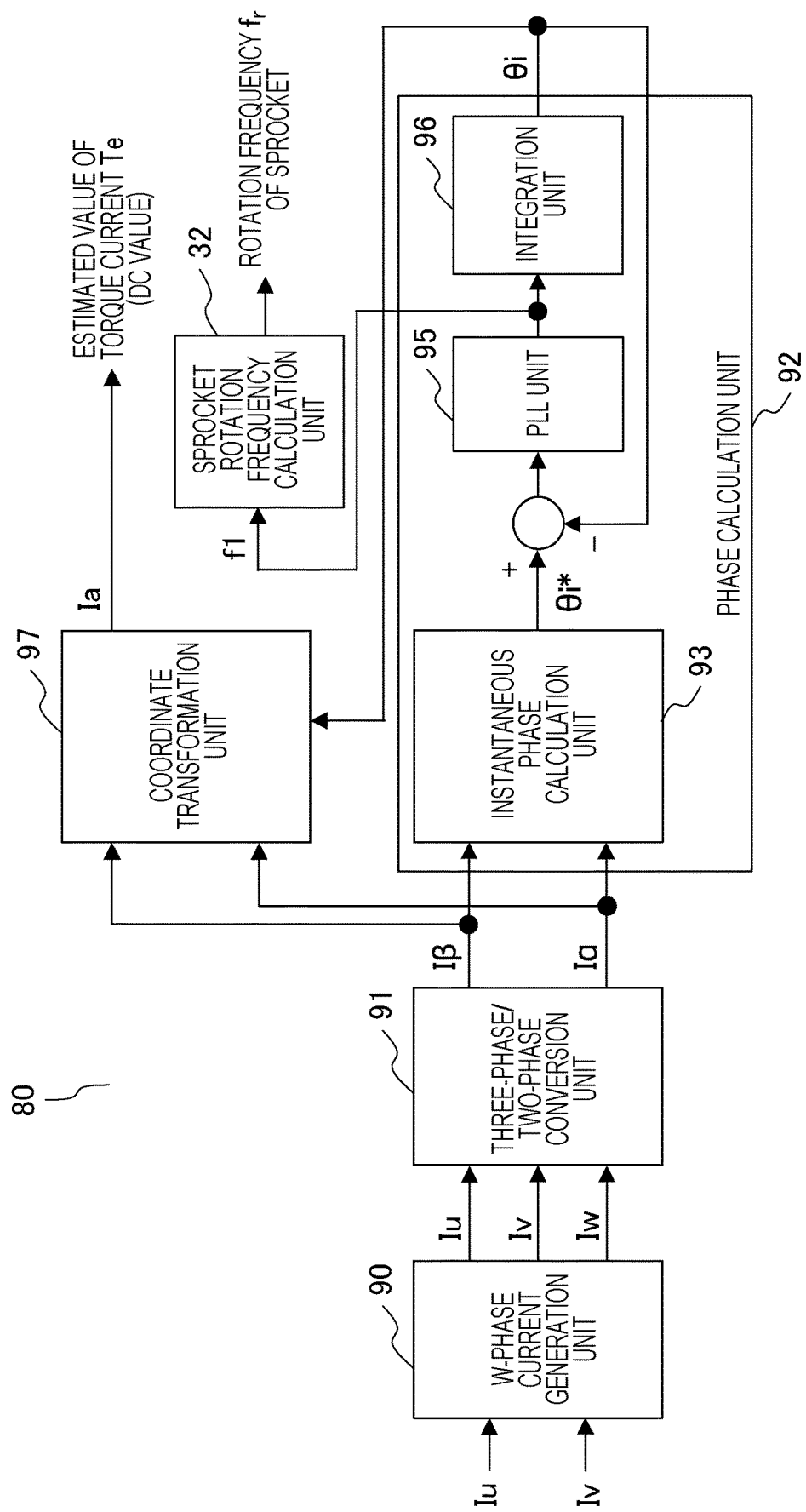
FIG. 12 is a diagram illustrating a configuration and a flow of processing of a signal processing unit in the third embodiment.

FIG. 12 is a diagram illustrating a configuration and a flow of processing of the signal processing unit 80. The signal processing unit 80 receives an input of current values of any two phases of the phase current of the motor 3, and calculates an estimated value Te of the torque current which is a DC value and the rotation frequency fr of the sprocket 5. In the present embodiment, as an example, the signal processing unit 80 acquires a U-phase current Iu and a V-phase current Iv. The signal processing unit 80 may acquire current values of three phases of the phase current of the motor 3.

The signal processing unit 80 includes a W-phase current generation unit 90, a three-phase/two-phase conversion unit 91, a phase calculation unit 92, and a coordinate transformation unit 97.

The W-phase current generation unit 90 receives an input of the U-phase current Iu and the V-phase current Iv acquired by the signal processing unit 80, and obtains a W-phase current Iw according to Expression (1).

$$Iw=-(Iu+Iv) \quad (1)$$

When the signal processing unit 80 acquires current values of three phases of the phase current of the motor 3, the W-phase current generation unit 90 does not perform the processing. In this case, the three-phase currents Iu, Iv, and Iw are input to the three-phase/two-phase conversion unit 91.

The three-phase/two-phase conversion unit 91 receives an input of the current Iu, the current Iv, and the current Iw, and obtains I$\alpha$ and I$\beta$ according to Expressions (2) and (3).

$$I\alpha=(2/3)\{Iu-Iv/2-Iw/2\} \quad (2)$$

$$I\beta=(1/\sqrt{3})\{Iv-Iw\} \quad (3)$$

I$\alpha$ and I$\beta$ are current components of an $\alpha$-axis and a $\beta$-axis perpendicular to each other.

The phase calculation unit 92 includes an instantaneous phase calculation unit 93, a PLL unit 95, and an integration unit 96, and calculates a phase necessary for coordinate transformation (conversion into a DC amount).

The instantaneous phase calculation unit 93 calculates an instantaneous phase $\theta i^*$ according to Expression (4).

$$\theta i^*=\tan^{-1}(I\beta/I\alpha) \quad (4)$$

The calculated instantaneous phase $\theta i^*$ is input to a feedback loop including the PLL unit (phase locked loop unit) 95 and the integration unit 96. The PLL unit 95 and the integration unit 96 are elements that perform filter processing.

The integration unit 96 finally generates a coordinate transformation phase $\theta i$ from the instantaneous phase $\theta i^*$ subjected to the feedback processing. The coordinate transformation phase $\theta i$ is an estimated value of the position of a rotor of the motor 3. In this processing process, the PLL unit 95 obtains the power supply frequency f1.

The sprocket rotation frequency calculation unit 32 performs processing similar to that described in the first embodiment, and calculates the rotation frequency fr of the sprocket 5 from the power supply frequency f1.

The coordinate transformation unit 97 receives an input of the $\alpha$-axis and $\beta$-axis current components I$\alpha$ and I$\beta$ obtained by the three-phase/two-phase conversion unit 91, and the coordinate transformation phase $\theta i$ obtained by the phase calculation unit 92, and performs coordinate transformation. This coordinate transformation is processing expressed by Expression (5).

$$Ia=I\alpha^*\cos(\theta i)+I\beta^*\sin(\theta i) \quad (5)$$

The coordinate transformation unit 97 obtains a DC amount Ia by the processing of Expression (5).

A method of calculating the DC amount Ia by using the above Expressions (1) to (5) is a method using a known conventional technique.

The DC amount Ia is similar to the temporal change of the torque current (DC value) used in motor control. Therefore, in the present embodiment, the DC amount Ia is handled as the estimated value Te of the torque current.

The estimated value Te (DC amount Ia) of the torque current has a component obtained by removing the component of the power supply frequency f1, similar to the envelope component E that is the DC value in the second embodiment. Thus, the noise level is low, and a small load variation can also be captured.

By using the estimated value Te of the torque current calculated from the phase currents of two or more phases of the motor 3, the stretch detection system 11 according to the present embodiment can more accurately capture the load variation due to the abnormality than the stretch detection system 11 according to the first or second embodiment. Therefore, the stretch detection system 11 according to the present embodiment can more accurately detect the stretch of the chain 7.

Fourth Embodiment

A stretch detection system 11 of a power transmission mechanism according to a fourth embodiment of the present invention will be described. The stretch detection system 11 according to the present embodiment receives an input of the values of the torque current T and the power supply frequency f1 output from the power supply 2 that drives the motor 3, and performs integration on the torque current T, which is a DC value to calculate an integral value, thereby detecting stretch of a chain 7 being the power transmission mechanism. The stretch detection system according to the present embodiment will be mainly described below focusing on differences from the stretch detection system according to the third embodiment.

Figure 13:
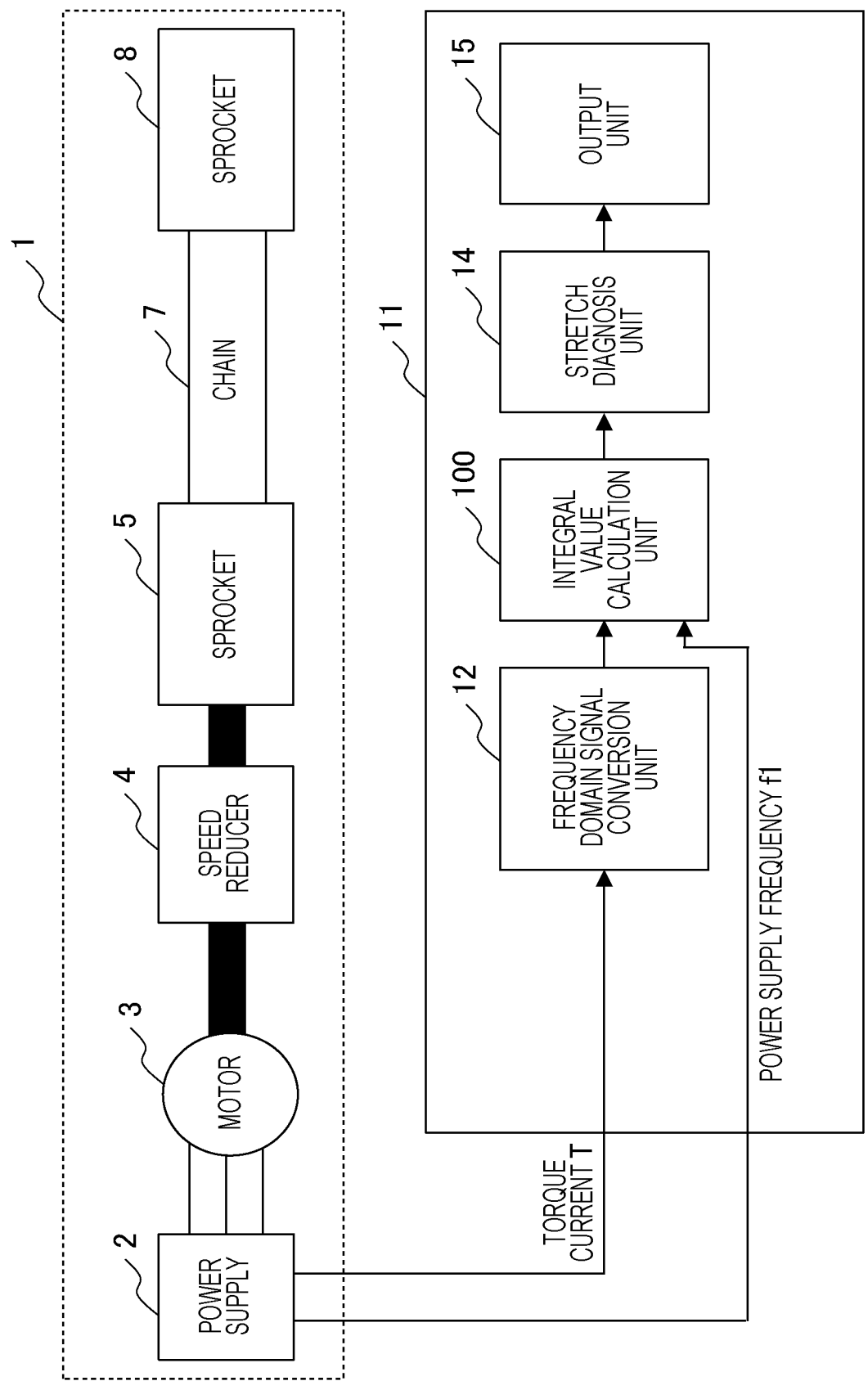
FIG. 13 is a diagram illustrating a configuration example of a stretch detection system of a power transmission mechanism according to a fourth embodiment of the present invention.

FIG. 13 is a diagram illustrating a configuration example of the stretch detection system 11 of the power transmission mechanism according to the present embodiment. The stretch detection system 11 according to the present example is different from the stretch detection system 11 according to the third example in that the signal processing unit 80 included in the stretch detection system 11 (FIG. 11) according to the third example is not provided, and an integral value calculation unit 100 performs processing different from that of the integral value calculation unit 51 in the stretch detection system 11 according to the third embodiment. The stretch detection system 11 according to the present embodiment is also different from the stretch detection system 11 according to the third embodiment in that the values of the torque current T and the power supply frequency f1 output from the power supply 2 that drives the motor 3 are acquired (in the stretch detection system 11 according to the first to third embodiments, the value of the phase current of the motor 3 is acquired).

In the present embodiment, in the conveyor system 1, the power supply 2 that drives the motor 3 is assumed to be an inverter. The inverter includes at least one of an external output terminal and a network communication unit, and can output the values of the torque current T and the power supply frequency f1 by connecting a cable to the external output terminal or by performing wireless communication or wired communication through the network communication unit. That is, the inverter which is the power supply 2 includes at least one of the external output terminal and the network communication unit as the current acquisition unit.

In the stretch detection system 11 according to the present embodiment, the frequency domain signal conversion unit 12 receives an input of the value of the torque current T which is a DC value from the power supply 2 (inverter), and the integral value calculation unit 100 receives an input of the value of the power supply frequency f1 from the power supply 2. The frequency domain signal conversion unit 12 converts a time-series signal of the torque current T into a frequency domain signal. The integral value calculation unit 100 receives an input of the power supply frequency f1 and the frequency domain signal of the torque current T, and performs integration on the frequency domain signal of the torque current T to calculate an integral value.

Since the stretch detection system 11 according to the present embodiment receives the input of the value of the power supply frequency f1 from the power supply 2, the peak extraction unit 31 (FIGS. 4 and 9) included in the stretch detection system 11 according to the first and second embodiments is not provided, and it is not necessary to obtain the value of the power supply frequency f1 as (in the signal processing unit 80 of FIG. 12) in the stretch detection system 11 according to the third embodiment.

Figure 14:
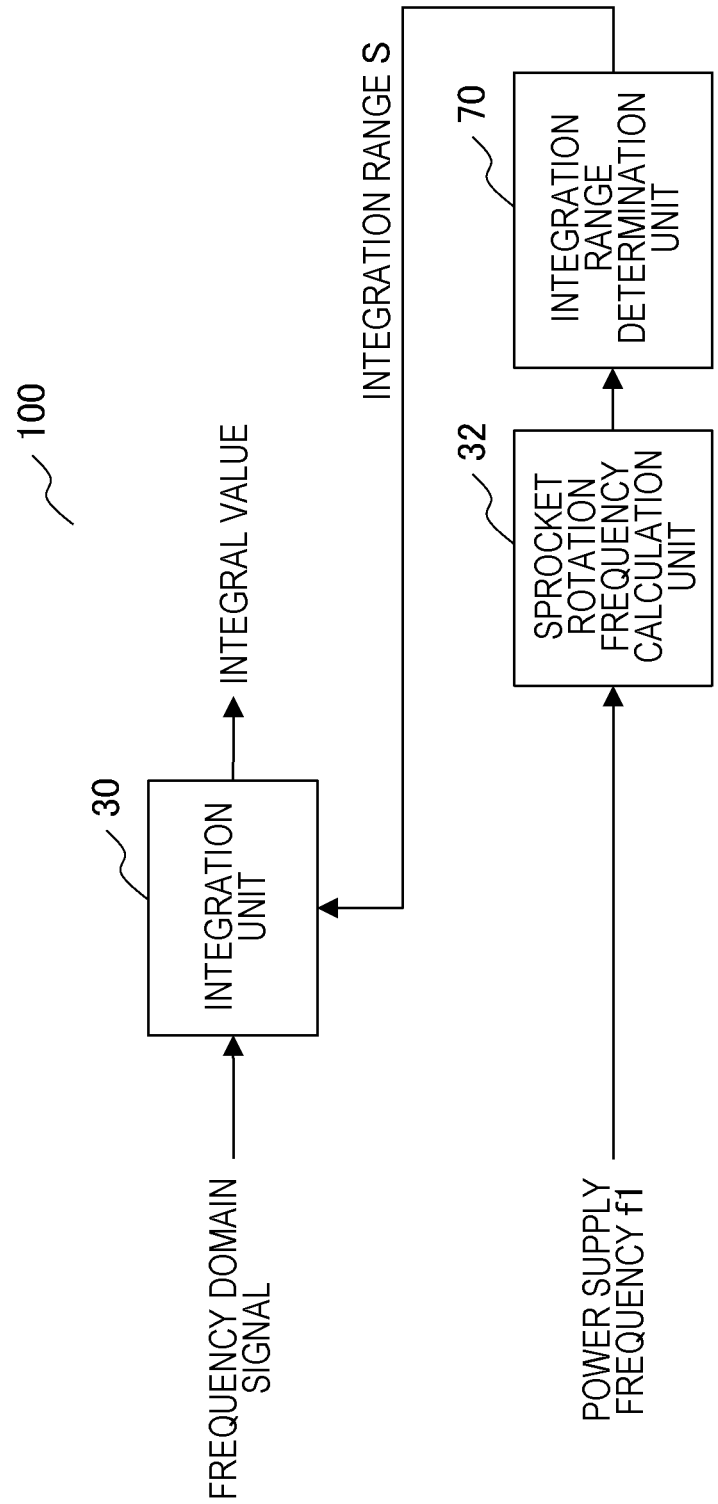
FIG. 14 is a diagram illustrating a configuration and a flow of processing of an integral value calculation unit in the fourth embodiment.

FIG. 14 is a diagram illustrating a configuration and a flow of processing of the integral value calculation unit 100. The integral value calculation unit 100 includes an integration unit 30, a sprocket rotation frequency calculation unit 32, and an integration range determination unit 70.

The sprocket rotation frequency calculation unit 32 obtains the rotation frequency fr of the sprocket 5 from the power supply frequency f1 input from the power supply 2. The integration range determination unit 70 determines the integration range S based on the rotation frequency fr of the sprocket 5 in the similar manner to the integration range determination unit 70 (FIG. 10) according to the second embodiment. The integration unit 30 receives an input of the frequency domain signal of the torque current T obtained by the frequency domain signal conversion unit 12 and the integration range S determined by the integration range determination unit 70, and obtains the integral value by calculation of integrating the frequency domain signal in the integration range S.

Instead of receiving the input of the value of the power supply frequency f1 from the power supply 2, the integral value calculation unit 100 (FIG. 13) may receive an input of the value of the rotation frequency of the shaft of the motor 3 from the power supply 2. When the integral value calculation unit 100 receives the value of the rotation frequency of the shaft of the motor 3, the sprocket rotation frequency calculation unit 32 (FIG. 14) can obtain the rotation frequency fr of the sprocket 5 without performing the processing of dividing the power supply frequency f1 by the number of pole pairs of the motor 3.

The stretch detection system 11 according to the present embodiment acquires the values of the torque current T and the power supply frequency f1 (alternatively, the rotation frequency of the shaft of the motor 3) from the power supply 2, and thus does not include the current sensor 10. Therefore, the stretch detection system 11 according to the present embodiment can accurately detect the stretch of the chain 7 with a simpler configuration than the stretch detection system 11 according to the first to third embodiments.

The present invention is not limited to the above embodiments, and various modifications can be made. For example, the above-described embodiments have been described in detail in order to describe the present invention in an easy-to-understand manner, and the present invention is not necessarily limited to an aspect including all the described configurations. Further, a part of the configuration of one embodiment can be replaced with the configuration of another embodiment. In addition, the configuration of another embodiment can be added to the configuration of one embodiment. In addition, a part of the configuration of each embodiment can be deleted, or another configuration can be added or replaced.

What is claimed is:

1. A stretch detection system of a power transmission mechanism, which is connectable to a conveyor system including a motor, a rotation mechanism driven by the motor, and the power transmission mechanism driven by rotation of the rotation mechanism, the stretch detection system comprising:
   a frequency domain signal conversion unit that converts a signal of a current of the motor into a frequency domain signal;
   an integral value calculation unit that calculates an integral value by performing integration on the frequency domain signal obtained by the frequency domain signal conversion unit, by extracting a power supply frequency, that is a frequency of a power supply that drives the motor, having a maximum peak value in the frequency domain signal, and by using, as an integration range, at least one of a plurality of regions of a plurality of sideband waves respectively corresponding to a plurality of frequencies determined using a rotation frequency of the rotation mechanism, each of the plurality of frequencies obtained by adding the rotation frequency or a harmonic of the rotation frequency to the power supply frequency;
   a stretch diagnosis unit that diagnoses a state of stretch of the power transmission mechanism by using the integral value calculated by the integral value calculation unit; and
   an output unit that outputs a diagnosis result of the stretch diagnosis unit.

2. The stretch detection system of a power transmission mechanism according to claim 1,
wherein the integration range does not include the rotation frequency and the harmonic frequency of the rotation frequency.

3. The stretch detection system of a power transmission mechanism according to claim 1,
wherein the integral value calculation unit performs integration for each of a plurality of integration ranges that do not overlap each other.

4. The stretch detection system of a power transmission mechanism according to claim 1,
wherein the current of the motor is a phase current of one or more phases.

5. The stretch detection system of a power transmission mechanism according to claim 1,
wherein the current of the motor is a torque current.

6. The stretch detection system of a power transmission mechanism according to claim 1,
wherein the power transmission mechanism is a chain or a belt.

7. The stretch detection system of a power transmission mechanism according to claim 1,
wherein the output unit outputs the diagnosis result to at least one of a display, a speaker, a lamp, a control device of the conveyor system, and a control device of the motor.

8. The stretch detection system of a power transmission mechanism according to claim 1,
wherein the integral value calculation unit sets, as the integration range, at least one of a region, being one of the plurality of regions, of one of the plurality of sideband waves having the frequency obtained by adding the rotation frequency to the power supply frequency, and a region, being one of the plurality of regions, of a sideband wave having the frequency obtained by adding a harmonic frequency of the rotation frequency to the power supply frequency.

9. The stretch detection system of a power transmission mechanism according to claim 2,
wherein the integration range does not include the frequency obtained by adding the rotation frequency to the power supply frequency and the frequency obtained by adding the harmonic frequency of the rotation frequency to the power supply frequency.

* * * * *